(12) United States Patent
Sweet et al.

(10) Patent No.: US 11,678,003 B2
(45) Date of Patent: Jun. 13, 2023

(54) MEDIA PLAYBACK SYNCHRONIZATION ON MULTIPLE SYSTEMS

(71) Applicant: Charter Communications Operating, LLC, St. Louis, MO (US)

(72) Inventors: John Sweet, Englewood, CO (US); Horatio Derrick Kipchoge Boothe, Denver, CO (US); Cristian G. Vyhmeister, Franktown, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/352,565

(22) Filed: Jun. 21, 2021

(65) Prior Publication Data

US 2022/0408139 A1    Dec. 22, 2022

(51) Int. Cl.
*H04N 21/43* (2011.01)
*H04N 21/472* (2011.01)
*H04N 21/81* (2011.01)
*H04N 21/439* (2011.01)
*H04N 21/458* (2011.01)

(52) U.S. Cl.
CPC ....... *H04N 21/4302* (2013.01); *H04N 21/439* (2013.01); *H04N 21/458* (2013.01);
(Continued)

(58) Field of Classification Search
CPC ............. H04N 21/4302; H04N 21/439; H04N 21/458; H04N 21/47217; H04N 21/812;
(Continued)

(56) References Cited

U.S. PATENT DOCUMENTS 10,419,794 B2\* 9/2019 Dalbec ............ H04N 21/47217
2005/0138674 A1\* 6/2005 Howard ............ H04N 21/8547
725/135

(Continued)

FOREIGN PATENT DOCUMENTS

CN    107710771 A  \*  2/2018  ......... H04N 21/2387

OTHER PUBLICATIONS

Devin, Coldeway, Actiview aims to streamline move accessibility for millions of hearing and vision impaired:, Jun. 13, 2017, pp. 1-19.
(Continued)

*Primary Examiner* — Cynthia M Fogg
(74) *Attorney, Agent, or Firm* — Armis IP Law, LLC

(57) ABSTRACT

A system includes a primary playback system and a secondary playback system. The primary playback system plays back selected content. The secondary playback system monitors progress of the primary playback system playing back the content. Based on detected progress, the secondary playback system synchronizes playback of supplemental media (such as descriptive audio, closed caption text, etc.) associated with the content on a secondary playback system operated by a user. In response to detecting a scheduled advertisement window during playback of the content on the primary playback system, the secondary playback system discontinues playback of the supplemental media associated with the content on the secondary playback system. During or after playback of the advertisement on the primary playback system, the secondary playback system monitors playback of the selected content by the primary playback system to re-synchronize playback of supplemental media to the playback of the content on the secondary playback system.

36 Claims, 7 Drawing Sheets

(52) U.S. Cl.
CPC ..... *H04N 21/47217* (2013.01); *H04N 21/812* (2013.01); *H04N 21/8126* (2013.01)

(58) Field of Classification Search
CPC ........... H04N 21/8126; H04N 21/8456; H04N 21/4884
USPC .......................................................... 725/32
See application file for complete search history.

(56) References Cited

U.S. PATENT DOCUMENTS

| | | | |
|---|---|---|---|
| 2013/0346631 A1* | 12/2013 | Gandhi .............. | H04N 21/4223 709/248 |
| 2014/0237082 A1* | 8/2014 | Chen .................. | H04N 21/2143 709/219 |
| 2015/0086173 A1* | 3/2015 | Abecassis .......... | H04N 21/4722 386/201 |
| 2016/0044363 A1* | 2/2016 | Panje .............. | H04N 21/47217 725/80 |
| 2016/0269771 A1* | 9/2016 | Bangma ............. | H04N 21/4126 |
| 2016/0316233 A1* | 10/2016 | Ghadi ................ | H04N 21/4302 |
| 2016/0323482 A1* | 11/2016 | Chung ............. | H04N 21/43079 |
| 2019/0356939 A1* | 11/2019 | Kuo ................ | H04N 21/41415 |

OTHER PUBLICATIONS

Sara Bastian, "Actiview App Aims to Make Movie-Going More Inclusive and Accessible", Jun. 20, 2017, pp. 2, Technology (Http://Consumersresearch.org/Category/Issues/Technology-Lssues).

* cited by examiner

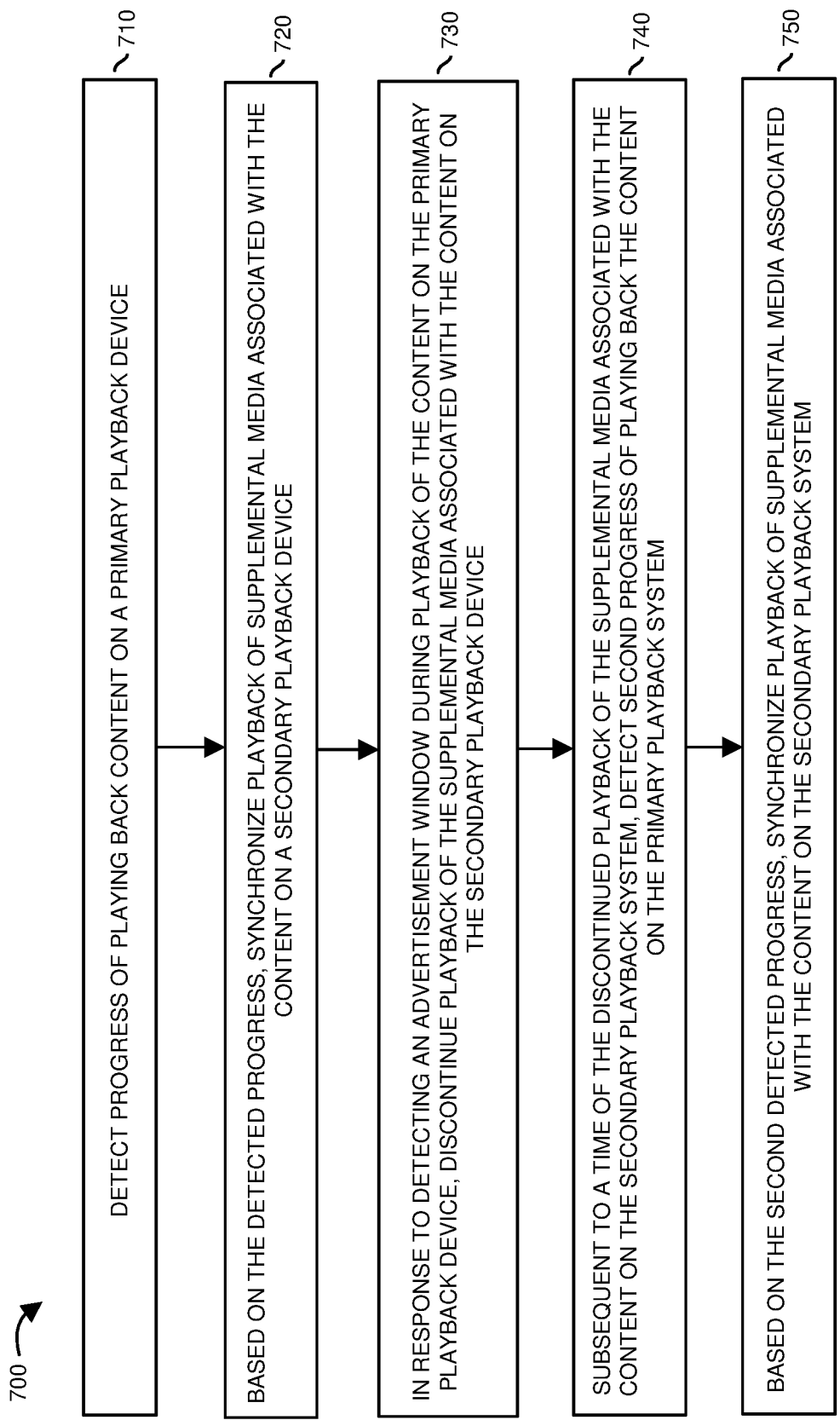

MEDIA PLAYBACK SYNCHRONIZATION ON MULTIPLE SYSTEMS

BACKGROUND

Conventional systems support playback of an audio file associated with a movie viewed in a movie theater. For example, a moviegoer can select an audio file associated with a movie being played in the movie theater. The moviegoer downloads the audio file to a mobile communication device.

During playback of the movie, via detected audio associated with the movie played back in the movie theater, a conventional application executed on the mobile communication device determines a portion (or playback location) of the movie currently being played back in the theater. The conventional application on the mobile communication device then plays back portions of the audio file (or text file as the case may be) pertinent to the current played back portion of the movie.

BRIEF DESCRIPTION OF EMBODIMENTS

Embodiments herein provide novel ways of synchronizing playback of supplemental media on secondary playback system with respect to playback of selected content played back on a primary playback system.

More specifically, a media playback system includes a primary playback system and a secondary playback system. In one embodiment, the secondary playback system is disparately located with respect to the primary playback system. A user selects a specific title of content for playback by the primary playback system. The secondary playback system receives notification of the selection of the content to be played back on the primary playback system and downloads supplemental media as specified by the notification to the secondary playback system.

Via control of a user, the primary playback system plays back a title of content selected by the user. The secondary playback system, monitors progress of the primary playback system playing back the selected content. In one embodiment, detected progress of playing back the title of content on the primary playback system is determined via monitoring an audio signal from the primary playback system.

Based on detected progress, a playback management application (such as in or with the secondary playback system) synchronizes playback of supplemental media (such as descriptive audio, closed caption text, etc.) associated with the content on the secondary playback system operated by a user. In other words, the playback of the supplemental media on the secondary playback system tracks playback of the title of content on the primary playback system.

In one embodiment, the primary playback system uses a so-called manifest file to retrieve different segments of content for display on a display screen of the primary playback system. In further example embodiments, the manifest file specifies one or more windows of time in which to playback advertisements instead of the segments of content associated with the selected title of content. Playback of advertisements on the primary playback system results in the need for the secondary playback system to re-synchronize with the primary playback system.

In response to detecting an advertisement window during playback of the content on the primary playback system, such as via information in the manifest file or other suitable resource, the secondary playback system discontinues playback of the supplemental media associated with the content on the secondary playback system during the advertisement window of time.

After playback of the advertisement, it is desirable to re-synchronize the playback of the supplemental media on the secondary playback system based on corresponding playback of the content on the primary playback system. In one embodiment, during or after playback of the scheduled advertisement on a display screen of the primary playback system, the secondary playback system monitors progress of playing back the selected title of content on the primary playback system again. Based on the detected progress, such as a pointer indicating a current location in the selected content being played back by the primary playback system, the secondary playback system resynchronizes playback of the appropriate portions of supplemental media to the playback of the title of content on the primary playback system.

Thus, via advertisements or other reasons of pausing the playback of the title of content on the primary playback system, a secondary playback system may lose synchronization with the primary playback system. Re-synchronization as discussed herein of the two playback systems ensures that the secondary playback system plays back supplemental media pertinent to the segments of content currently played by the primary playback system after advertisement breaks.

Accordingly, embodiments herein include detecting progress of playing back content on a primary playback system; based on the detected progress, synchronizing playback of supplemental media associated with the content on a secondary playback system; and in response to detecting an advertisement window during playback of the content on the primary playback system, temporarily discontinuing playback of the supplemental media associated with the content on the secondary playback system. The primary playback system plays back an advertisement during the advertisement window.

As previously discussed, the supplemental media played back by the secondary playback system can be implemented in any from. In one embodiment, the playback of the supplemental media associated with the content is an audio signal describing attributes such as images and/or audio information associated with current segments of content played back on a display screen of the primary playback system.

Note that, in another example embodiment, the playback of the supplemental media associated with the content is text-based information pertinent to the segments of content currently displayed on a display screen of the primary playback system.

In further example embodiments, the playback management application controlling playback of the supplemental media on the secondary playback system receives schedule information associated with or indicative of the one or more advertisement windows. In one embodiment, the playback management application detects the advertisement window via a time value retrieved from a manifest file associated with the content being played back on the primary playback system. As previously discussed, the primary playback system can be configured to use the manifest file to retrieve appropriate segments of content for playback by the primary playback system.

In still further example embodiments, the playback management application associated with the secondary playback system uses the schedule information to identify a time at which the advertisement window is scheduled to occur during playback of the content on the primary playback system. The playback management application at least temporarily discontinues playback of the supplemental media associated with the content on the secondary playback system at the identified time.

Still further example embodiments herein include, via the playback management application, subsequent to a time of the discontinued playback of the supplemental media associated with the content on the secondary playback system, detecting progress of playing back the content on the primary playback system. Based on the detected progress indicating a current timeframe or playback time of the content being played back on the primary playback system, the playback management application synchronizes playback of supplemental media associated with the content on the secondary playback system.

Note that synchronization as discussed herein can be achieved in any suitable manner. For example, synchronizing playback of supplemental media associated with the content on the secondary playback system includes: at the playback management application, receiving an audio signal associated with playback of the content on the primary playback system. In one embodiment, the audio signal is received by a microphone of the secondary playback system monitoring sounds emanating from the primary playback system. In such an instance, embodiments herein include, at the secondary playback system, monitoring an audio signal associated with playback of the content on the primary playback system. Based on the monitored audio signal, the playback management application determines a location (such as time stamp, index value, etc.) of the audio signal; maps the location of the detected audio signal to a playback location in the supplemental media; and initiates playback of the supplemental media on the secondary playback system starting at the identified playback location corresponding to the detected audio signal.

In still further example embodiments, detecting progress of playing back content on the primary playback system includes: i) receiving a signal indicative of the progress of playing back the content on the primary playback system, ii) deriving an index value (such as a time stamp or other suitable value) from the signal, the index value indicative of a current playback location (time stamp, index, pointer, etc.) of the content. Synchronizing playback of supplemental media associated with the content on a secondary playback system based on the detected progress includes: initiating playback of the supplemental media in accordance with the index value.

As previously discussed, and as further discussed herein, embodiments herein are useful over conventional techniques. For example, re-synchronization of the secondary playback system to the primary playback system after playback of a respective advertisement ensures that playback of the supplemental media tracks playback of the selected title of content on the primary playback system. In such an instance, synchronized playback of the original title of content (to a first person) and the supplemental media (to a second person) enables the first persona and second person to enjoy synchronized playback of the content, although in different forms.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: detect progress of playing back content on a primary playback system; based on the detected progress, synchronize playback of supplemental media associated with the content on a secondary playback system; and in response to detecting an advertisement break in playing back the content on the primary playback system, discontinue playback of the supplemental media associated with the content on the secondary playback system.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a further summary as well as detailed description) and corresponding figures of the present disclosure as further discussed below.

BRIEF DESCRIPTION OF THE DRAWINGS

FIG. 7 is an example diagram illustrating a method according to embodiments herein.

Figure 1:
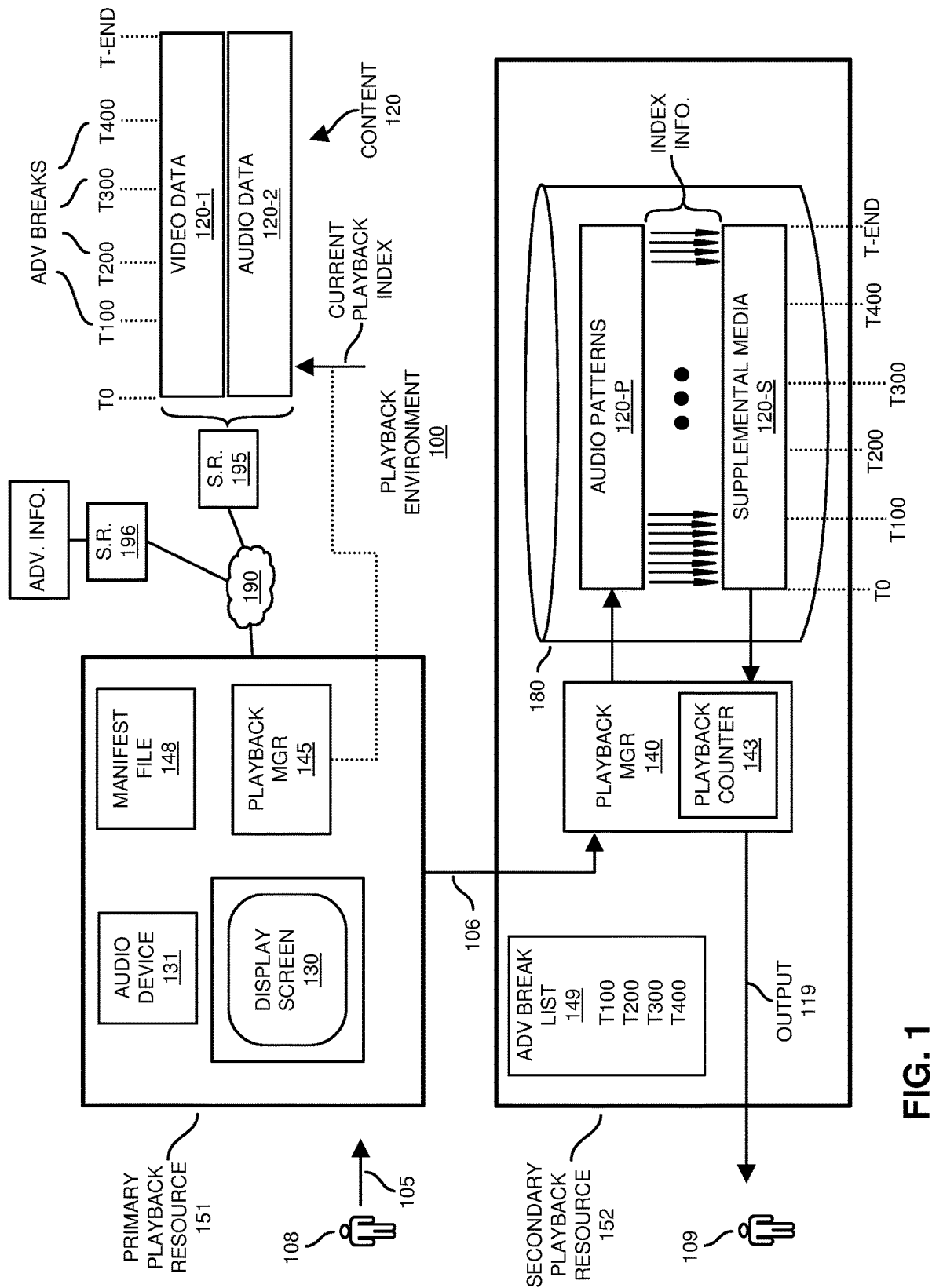
FIG. 1 is an example diagram illustrating multiple playback systems and synchronization of same according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein remedy desynchronization of supplemental media such as audio description, closed captioning, etc., caused by advertisement breaks when playing back content such as video on demand content. For example, a media playback application references a manifest file containing the timestamps of commercial (advertisement) breaks in streaming content such as a TV show, movie, etc. At the specified time stamps indicating an advertisement break, the media playback application starts a synchronizing process so that when the content is played back after a commercial (advertisement), the media playback application synchronizes with the played back program and resumes playback of corresponding supplemental media (such as audio description or close captioning information).

Thus, a system includes a primary playback system and a secondary playback system. The primary playback system plays back selected content. The secondary playback system initially monitors progress of the primary playback system playing back the content. Based on detected progress, the secondary playback system synchronizes playback of supplemental media (such as descriptive audio, closed caption text, etc.) associated with the monitored content on a secondary playback system operated by a user. In response to detecting a scheduled advertisement window during playback of the content on the primary playback system, the secondary playback system discontinues playback of the supplemental media associated with the content on the secondary playback system. During or after playback of the advertisement on the primary playback system, the secondary playback system again monitors playback of the selected content by the primary playback system to re-synchronize playback of supplemental media to the playback of the content on the secondary playback system.

Now, more specifically, with reference to the drawings, FIG. 1 is an example diagram illustrating multiple playback systems and playback tracking according to embodiments herein.

As shown, playback environment 100 includes primary playback resource 151 (first playback system), secondary playback resource 152 (second playback system), network 190, server resource 195, server resource 196, etc.

Primary playback resource 151 includes display screen 130, audio device 131, and playback manager 145. Secondary playback resource 152 includes playback manager 140 and repository 180.

Note that each of the resources as discussed herein can be configured to operate as hardware, executed software, or a combination of hardware and software.

More specifically, the playback manager 140 as discussed herein can be implemented as playback manager hardware, playback manager software, or a combination of playback manager hardware and playback manager software; the playback manager 145 as discussed herein can be implemented as playback manager hardware, playback manager software, or a combination of playback manager hardware and playback manager software; the primary playback resource 151 as discussed herein can be implemented as primary playback hardware, primary playback software, or a combination of primary playback hardware and primary playback software; the secondary playback resource 152 as discussed herein can be implemented as secondary playback hardware, secondary playback software, or a combination of secondary playback hardware and secondary playback software; and so on.

In one embodiment, the secondary playback resource 152 (a.k.a., primary playback system) is disparately located with respect to the primary playback resource 151 (a.k.a., primary playback system). For example, in one embodiment, the secondary playback resource 152 may be a mobile communication device operated by respective user 109.

In further example embodiments, via control input 105, the user 108 selects respective content 120 for playback on the display screen 130. This can include selection of a symbol displayed on display screen 130, pressing one or more buttons on a remote control device, etc. Thus, in one embodiment, the user 108 operates a respective remote control device that generates input 105 to select playback of the content 120.

Content 120 can be any suitable information. For example, content 120 can be video on demand data, movie, title of content, video data, etc., retrieved for playback on the primary playback resource 151.

In response to receiving a command (such as via input 105) to playback content 120 (such as a specific title of content), the playback manager 145 retrieves manifest file 148 associated with the content 120 from server resource 195 or other suitable entity.

In one embodiment, the primary playback resource 151 and corresponding playback manager 145 uses the manifest file 148 as a basis in which to retrieve and playback segments of content associated with the selected content 120.

For example, the manifest file 148 indicates different segments of content associated with content 120 for retrieval from the server resource 195. In one embodiment, the manifest file 148 includes pointers (such as URLs or other suitable information) indicating locations in network 190 from which to retrieve the respective segments of content for playback.

In certain instances, the manifest file 148 may offer multiple different bit rates from which the playback manager 145 is able to retrieve segments of content for playback on the playback system (display screen 130 and audio device 131).

Figure 2:
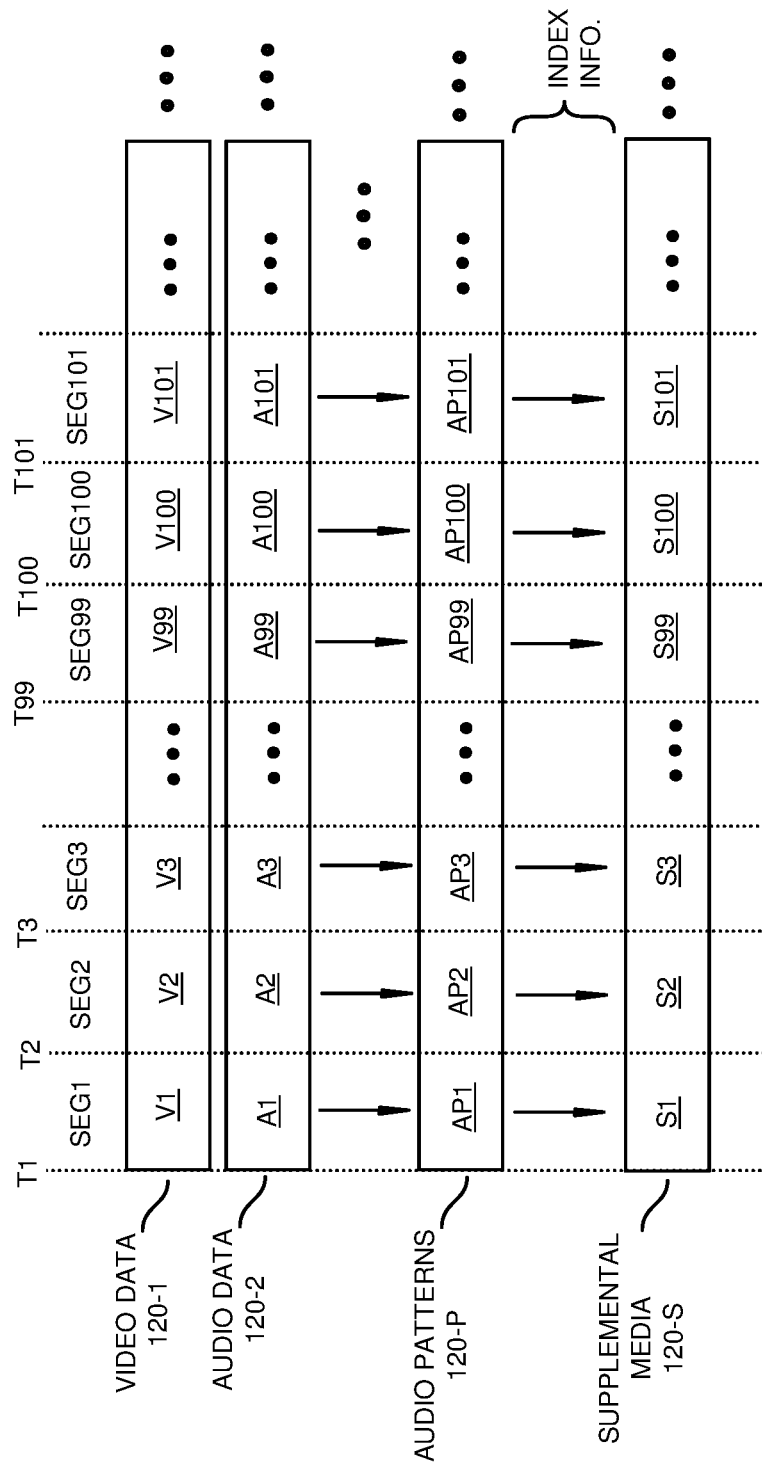
FIG. 2 is an example diagram illustrating mapping of segments of content associated with a title of content to segments of corresponding supplemental media according to embodiments herein.

In still further example embodiments, as further shown in FIG. 2, the content 120 is broken down into discreet, retrievable segments of content 120 that are played back by the display screen 130 and the audio device 131.

FIG. 2 is an example diagram illustrating retrievable segments of content and mapping of related data according to embodiments herein.

As shown, the content 120 in this embodiment includes video data 120-1 such as played back on display screen 130 and audio data 120-2 such as played back on the audio device 131 (such as a speaker).

In this example embodiment, segment SEG1 of content 120 is assigned time stamp T1 and includes video data V1 and audio data A1; segment SEG2 of content 120 is assigned time stamp T2 and includes video data V2 and audio data A2; segment SEG3 of content 120 is assigned time stamp T3 and includes video data V3 and audio data A3; . . . ; segment SEG99 of content 120 is assigned time stamp T99 and includes video data V99 and audio data A99; segment SEG100 of content 120 is assigned time stamp T100 and includes video data V100 and audio data A100; segment SEG101 of content 120 is assigned time stamp 101 and includes video data V101 and audio data A101; and so on.

Note that the video data 120-1 and audio data 120-2 for each of the segments are correlated with each other for simultaneous playback such that sound from the audio device 131 tracks corresponding images on display screen 130.

For example, audio data A1 associated with segment SEG1 includes appropriate audio for playback on audio device 131 (producing sound) during playback of video data V1 (as images on display screen 130) associated with segment SEG1; audio data A2 associated with segment SEG2 includes appropriate audio for playback on audio device 131 (producing sound) during playback of video data V2 (as images on display screen 130) associated with segment SEG2; audio data A3 associated with segment SEG3 includes appropriate audio for playback on audio device 131 (producing sound) during playback of video data V3 (as images on display screen 130) associated with segment SEG3; and so on.

Embodiments herein include implementing technology such as "fingerprinting" and audio synchronization.

For example, in one embodiment, a pre-processing operation includes processing the audio data 120-2 (such as an audio file) associated with content 120 and converting (such as via slicing) it into millions of identifiers, or chunks of identifiable audio patterns. These identifiers (a.k.a., audio patterns) are stored as audio patterns 120-P including AP1, AP2, AP3, etc.

In one embodiment, as previously discussed, playback of the audio data A1 results in an audio signal (emanating from audio device 131) as represented by the audio pattern AP1; playback of the audio data A2 results in an audio signal as represented by the audio pattern AP2; playback of the audio data A3 results in an audio signal as represented by the audio pattern AP3; and so on.

In such an instance, playback of corresponding audio associated with the content 120 enables a respective processing entity (such as playback manager 140) to determine a current playback location of the content by the primary playback resource 151.

For example, as previously discussed, the content 120 includes video data V1 that is simultaneously played back with audio data A1. In one embodiment, the playback manager 140 of secondary playback resource 152 monitors output 106 (from primary playback resource 151) such as a playback of audio data A1 associated with the content 120 to determine a current playback location. For example, the playback manager 140 converts the received output 106 (audio playback of audio A1) into an sample audio pattern and compares the detected sample audio pattern associated with A1 to those stored in the audio patterns 120-P.

Note that the size of the audio pattern sampled by the playback manager 140 can vary. In one embodiment, the playback sample is a moving window of time sample including a pattern associated with playback of respective audio generated by the audio device 131.

Thus, in one embodiment, in order to synchronize playback of supplemental media 120-S with the playback of content 120, a microphone on the secondary playback resource 152 (such as a mobile communication device) receives output 106 and records the audio outputted from the audio device 131 associated with playback of content 120. The microphone captures this environmental audio and, in real-time, the playback manager 140 application processes or converts the received signal (such as audio signal) into one or more audio patterns (such as one or more identifiers). In real-time, the synchronization process implemented by the secondary playback resource 152 compares the detected identifiers (sample audio pattern from monitoring output 106) against the stored audio patterns 120-1.

In further example embodiments, the degree of likeness between the sample audio pattern and the audio patterns 120-P may vary. In one embodiment, the playback manager 140 determines a confidence level of matching the detected audio pattern of playing back A1 to the audio patterns 120-P. In response to detecting that the detected audio pattern confidence level is above a threshold level, indicating a most likely current location of play back in the content 120, the playback manager 140 uses the corresponding index value or timestamp value or pointer (TO or T1) assigned to the audio pattern API to playback appropriate supplemental media 120-S (such as audio description, close captioning, etc.). For example, if the monitored signal (such as output 106) from the primary playback resource 151 indicates playback of the audio data A2, the playback manager 140 initiates playback of the supplemental media S2 from supplemental media 120-S; if the monitored signal (such as output 106) from the primary playback resource 151 indicates playback of the audio data A3, the playback manager 140 initiates playback of the supplemental media S3 from supplemental media 120-S; and so on.

Referring again to FIG. 1, embodiments herein further include, via implementation of playback manager 140, playing back supplemental media 120-S associated with content 120 for user 109. As previously discussed, the playback of the supplemental media 120-S depends on a current playback location of the primary playback resource 151 playing back content 120 on display screen 130 and audio device 131 for user 108.

For example, as previously discussed, the user 108 selects a specific title of content (such as content 120) for playback by the primary playback resource 151. In one embodiment, the secondary playback resource 152 receives notification of the selection of the content 120 being played back on the primary playback resource 151.

Alternatively, an entity such as user 108 or user 109 programs the secondary playback resource 152 to playback supplemental media 120-S associated with the selected content 120. For example, the user 108 or user 109 notifies the secondary playback resource 152 that content 120 has been selected for playback on the primary playback resource 151 or the user 108/user 109 selects the supplemental media 120-S associated with the content 120 for playback on the secondary playback resource 152.

In one embodiment, the user 108 or user 109 downloads the companion information (supplemental media 120-S such as a media file) associated with the selected content 120 from a server or other suitable entity over network 190 to the represent 180.

The primary playback resource 151 plays back the selected content 120 on display screen 130 and audio device 131. Via signal 106 received from the primary playback resource 151, the secondary playback resource 152 monitors progress of the primary playback resource 151 playing back the selected content 120. As previously discussed, the signal 106 indicates a current playback location of the primary playback resource 151 playing back the content 120.

Based on detected progress indicative of a current playback location of the playback manager 145 playing back the content 120, the playback manager 140 (such as in or associated with the secondary playback system) synchronizes playback of supplemental media (such as descriptive audio, closed caption text, etc.) associated with the content 120 on the secondary playback system operated by a user.

Note that the output 119 can be any suitable perceptible signal such as text, images, audio, etc., played back on the secondary playback resource 152.

In one embodiment, as previously discussed, the primary playback resource uses the manifest file 148 to retrieve different segments of content for display on a display screen 130 and playback of audio on audio device 131 of the primary playback resource 151. An example of the manifest file 148 is shown in FIG. 3.

Figure 3:
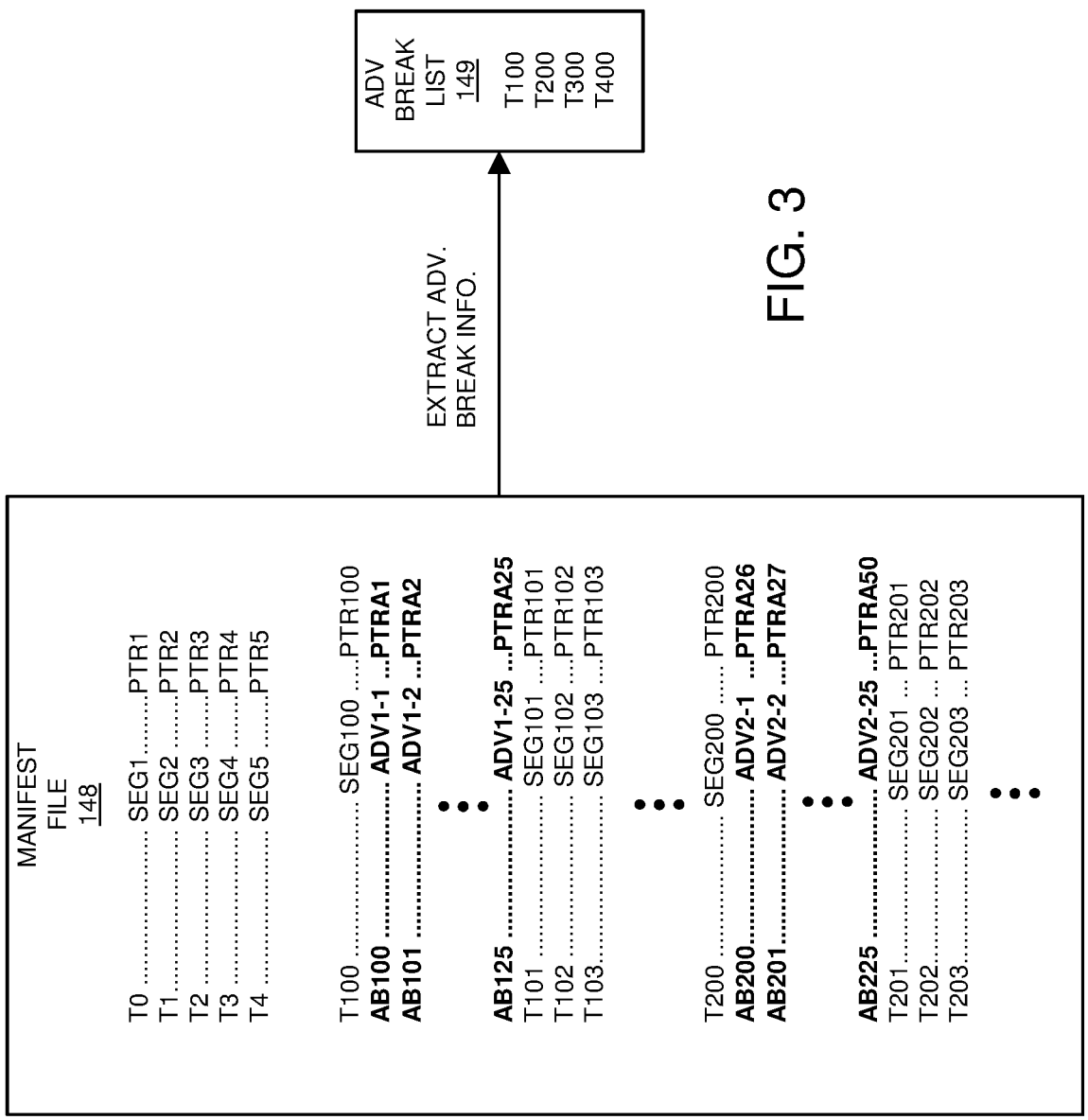
FIG. 3 is an example diagram illustrating a manifest file including advertisement breaks according to embodiments herein.

FIG. 3 is an example diagram illustrating a manifest file including advertisement breaks according to embodiments herein.

In this example embodiment, the manifest file 148 specifies one or more windows of time in which to playback advertisements instead of the segments of content associated with the selected title of content 120. As further discussed herein, playback of advertisements on the primary playback system results 151 in the need for the secondary playback system 152 to occasionally re-synchronize with the primary playback system 151.

As previously discussed, the primary playback resource 151 and corresponding playback manager 145 uses the manifest file 148 to retrieve the different segments of content for playback on the primary playback resource 151. For example, the pointer PTR1 points to a location from which to retrieve segment SEG1; the pointer PTR2 points to a location from which to retrieve segment SEG2; the pointer PTR3 points to a location from which to retrieve segment SEG3; and so on.

Note that manifest file 148 also indicates segments of content associated with retrieval of different advertisement during different windows of time. For example, manifest file 148 indicates pointers and corresponding segments of content (ADV1-1, ADV1-2, . . . , ADV1-25) associated with playback of a first advertisement ADV1 on the primary playback resource 151 in a first window of time between playback of segment SEG100 and segment SEG101 of the content 120; manifest file 148 indicates pointers and corresponding segments of content (ADV2-1, ADV2-2, . . . , ADV2-25) associated with playback of a second advertisement ADV2 on the primary playback resource 151 in a second window of time between playback of segment SEG200 and segment SEG201; and so on.

In one embodiment, the secondary playback resource 152 or other suitable entity extracts so-called advertisement break information associated with the manifest file 148 and records same in an advertisement break list 149. As its name suggests, the advertisement break list specifies timing of the corresponding advertisements to be played back during the playback of content 120.

Figure 4:
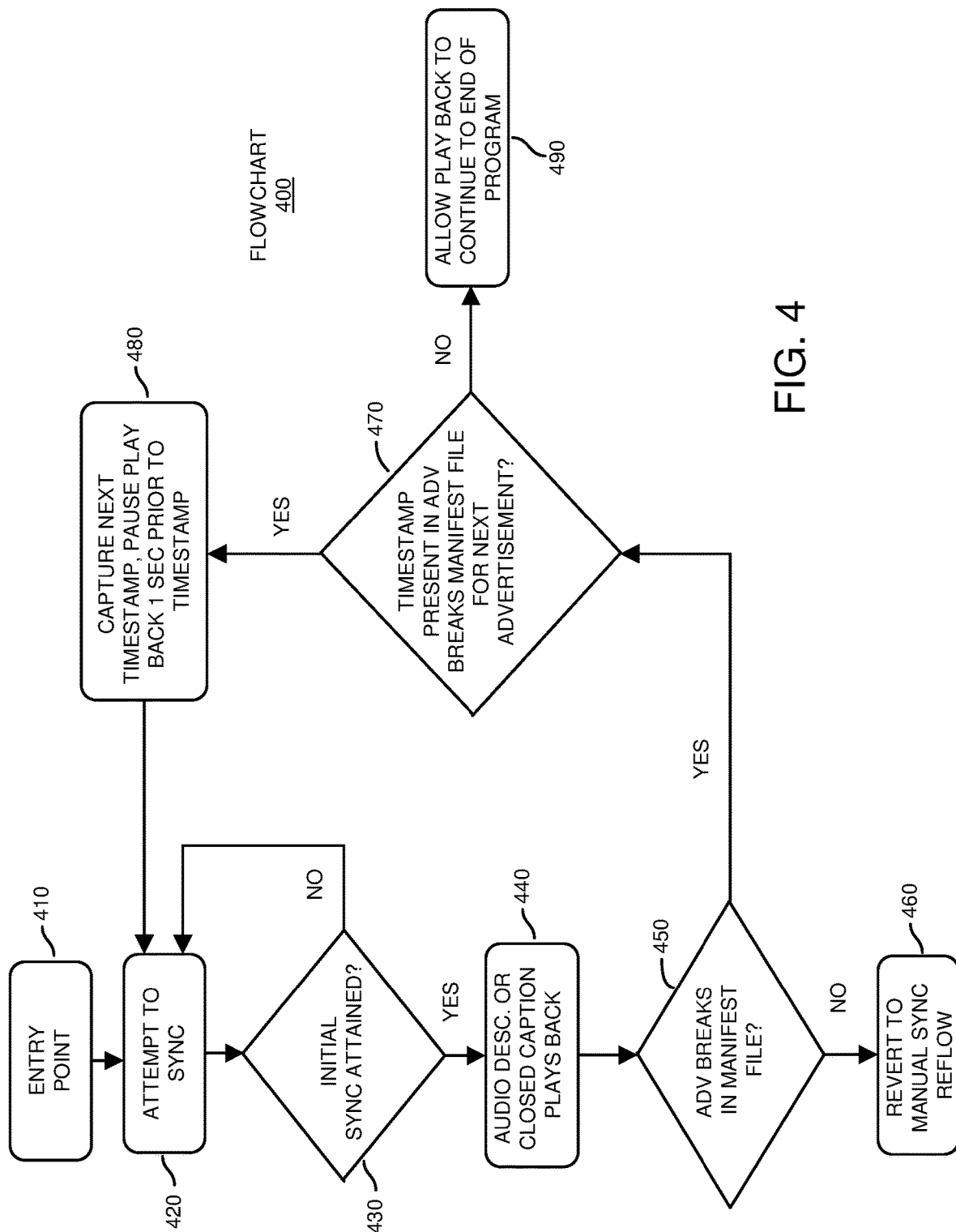
FIG. 4 is an example flowchart diagram illustrating re-synchronization of playing back supplemental media on a secondary playback system after playback of an advertisement on a primary playback system according to embodiments herein.

FIG. 4 is an example flowchart diagram illustrating re-synchronization of playing back supplemental media on a secondary playback system after playback of an advertisement on a primary playback system according to embodiments herein.

In processing operation 410, the playback manager 140 starts execution of the flowchart 400 to synchronize playback of the supplemental media 120-S (on secondary playback resource 152) with respect to the playback of the content 120 (on primary playback resource 151).

In processing operation 420, the playback manager 140 attempts to synchronize the secondary playback resource 152 to the primary playback resource 151. As previously discussed, this includes receiving output 106 and comparing a received pattern of an audio signal to different audio patterns 120-P associated with the content 120.

In processing operation 430, if initial synchronization is not or cannot be attained (such as because the playback manager 140 is unable to identify a current playback location of the content via primary playback resource 151), the playback manager 140 continues to monitor the output 106 and compare it to the audio patterns 120-P in order to determine a current playback location of content 120 by the primary playback resource 151. If no match is found, the playback manager 140 loops back to processing operation 420.

Alternatively, if initial synchronization is attained (such as because the playback manager 140 is able to identify a current playback location of the content via primary playback resource 151) in processing operation 430, processing associated with flowchart 400 as executed by the playback manager 140 continues at processing operation 440. Additionally, the playback manager 140 sets the playback counter 143 to the appropriate value (indicating the current location count value of playback associated with the streaming content 120). Note that, in one embodiment, the playback counter 143 increments over time and keeps track of the location in content 120 currently played back by the playback manager 145. In other words, after initial synchronization with the playback of content 120 by primary playback resource 151, the playback counter 143 (such as incrementing based on passage of time) tracks and indicates a current playback location of the playback manager 145 playing back the content 120.

In processing operation 440, the playback manager 140 plays back (via generation of output 119 (such as an audio signal, video signal, text information, etc.) the appropriate portions of the supplemental media 120-S depending on the current playback counter 143.

In processing operation 450, the playback manager 140 determines if there are any advertisement breaks associated with manifest file 148 as indicated in the advertisement break list 149. In one embodiment, in response to detecting that advertisement breaks are scheduled in manifest file 148, the playback manager 140 stores the detected advertisement break values T100, T200, T300, T400, etc., or other suitable information as advertisement break list 149. The advertisement break information indicates one or more of time slots, windows, start advertisement, etc., in which the playback manager 145 is to at least start playback of a respective advertisement. For example, as previously discussed, the manifest file 148 indicates to playback ADV1 (such as including one or more segments ADV1-1, ADV1-2, . . . , ADV1-25) between segment SEG100 (time T100) and segment SEG101 (time T101) of the content 120; the manifest file 148 indicates to playback advertisement ADV2 (such as including one or more segments ADV2-1, ADV2-2, . . . , ADV2-25) between segment SEG200 (time T200) and segment SEG201 (time T201) of the content 120; and so on.

The playback manager 140 or other suitable entity stores the advertisement break information T100, T200, T300, etc., (which are assigned to the segments of content 120) in the advertisement break list 149 and references the list 149 to identify when to discontinue playback of the supplemental media 120-S.

Note that if no advertisements breaks are identified in the manifest file 148 in processing operation 450, the playback manager defaults to processing operation 460 in which the playback manager 140 reverts to repeated manual synchronization of the playback manager 140 to the playback of the content on the primary playback resource 151.

In processing operation 470, the playback manager 140 determines whether or not there is a timestamp present in the advertisement break list 149 for an upcoming scheduled advertisement. If no immediate upcoming advertisement break is present in the list 149, the playback manager executes processing operation 490 which the playback manager 140 plays back the supplemental media 120-S in accordance with the current time stamp of the incrementing playback counter 143.

Conversely, in processing operation 470, if an immediate upcoming advertisement break is present in the list 149, the playback manager 140 continues at processing operation 480. In such an instance, when there is another advertisement break in the manifest file 148, in processing operation 480, the playback manager 140 retrieves a next advertisement break value (such as time stamp T200, etc.). The playback manager 140 pauses playback of the supplemental media 120-S in response to detecting that the playback counter 143 indicates scheduled playback of an advertisement (ADV1, ADV2, ADV3, etc.) by the playback manager 145. Because the playback manager 145 stops playing back content 120 during the advertisement break starting at times T100, T200, T300, etc., the playback manager 140 stops playing back supplemental media 120-S at respective times T100, T200, T300, and so on.

Subsequent to processing operation 480, processing continues at processing operation 420. In a similar manner as previously discussed, the playback manager 140 repeats a process of synchronizing the secondary playback resource 152 to the primary playback resource 151. For example, the playback manager 145 eventually completes playback of the advertisement ADV1 and reverts to playing back the segment SEG101 associated with the content 120. During the re-synchronization, and after playing back the advertisement ADV1, the playback manager 145 plays back segment SEG101 (such as video data V101 and audio data A101) via primary playback resource 151. The playback manager 140 detects the audio data A101 and maps the detected playback of audio data A101 associated with played back segment SEG101 (via monitoring output 106) to the audio pattern AP101 in the audio patterns 120-P. The playback manager 140 sets the playback counter 143 to the time stamp T101. The playback counter 143 then increments over time.

The playback manager 140 resumes playing back segments of supplemental media 120-S starting at supplemental media segment S101 as the magnitude of the playback counter 143 increases over time.

The process repeats during playback of each f the advertisements ADV1, ADV2, ADV3, etc.

Figure 5:
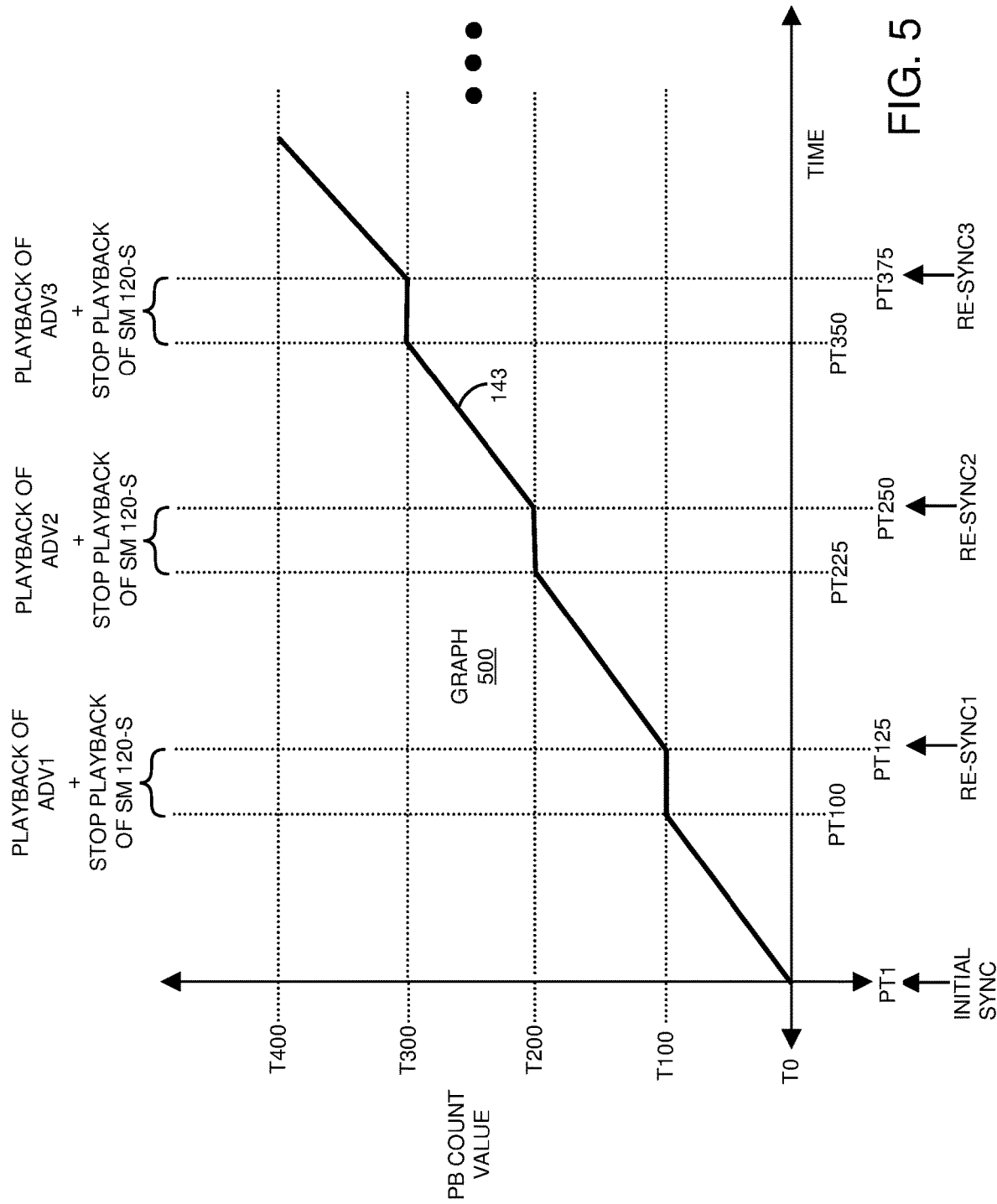
FIG. 5 is an example timing diagram illustrating according to embodiments herein.

FIG. 5 is an example timing diagram illustrating according to embodiments herein.

In this example embodiment, the timing diagram (graph 500) illustrates synchronized operation of playing back content 120 and corresponding supplemental media 120-S over time.

For example, the primary playback resource 151 starts playing back the content 120 at segment SEG1 at playback time PT0. During initial synchronization at or around playback time PT0, the playback manager 140 detects playback of the segment SEG1 of content 120 and sets the playback counter 143 to a time stamp value of T1. As previously discussed, the playback counter 143 then increments the time stamp value of playback counter 143 over time.

Further, as previously discussed, the playback manager 140 uses the value of the playback counter 143 to playback corresponding supplemental media 120-S via the secondary playback resource 152. In such an instance, at or around playback time PT1, the playback manager 145 initiates playback of video data V1 and audio data A1 while the playback manager 140 plays back supplemental media S1; at or around playback time PT2, the playback manager 145 initiates playback of video data V2 and audio data A2 while the playback manager 140 plays back supplemental media S2; at or around playback time PT3, the playback manager 145 initiates playback of video data V3 and audio data A3 while the playback manager 140 plays back supplemental media S3; and so on.

As previously discussed, the playback manager 140 monitors for occurrence of a scheduled advertisement break, the first of which is scheduled to occur at or around time T100 (or PT100). In response to detecting the count value of the playback counter 143 being at or around T100 (corresponding to PT100), the playback manager 140 discontinues playback of the supplemental media 120-S at or around playback time PT100 because it is known that the playback manager 145 will implement an advertisement playback instead of playing back the content 120. Between playback time PT100 and PT125, the playback manager 145 plays back advertisement ADV1 (corresponding segments of content ADV1-1, ADV1-2, ADV1-3, and so on) on primary playback resource 151.

Additionally, at any time during the timeframe between PT100 and PT125, the playback manager 140 attempts to re-synchronize with the primary playback resource 151 via monitoring output 106 because the playback manager 145 eventually resumes playback of the content 120 again after playback of the advertisement.

For example, eventually, after playback of the advertisement ADV1, the primary playback resource 151 starts playing back the content 120 at segment SEG101 at or around time PT126. In response to detecting playback of the segment SEG101 (and corresponding audio and video) at or around playback time PT126, the playback manager 140 sets the playback counter 143 to a time stamp value of T101. Thus, during re-synchronization at or around time PT126, the playback manager 140 detects playback of the segment SEG101 and sets the playback counter 143 to time stamp T101. The playback counter 143 then increments the value of the playback counter 143 over time. The playback counter 143 is again used by the playback manager 140 to control playback of corresponding supplemental media 120-S via the secondary playback resource 152. For example, between playback time PT125 and PT225, the playback manager 140 synchronously plays back supplemental media segments of content S101 to S200 while the playback manager plays back segments of content SEG101 to SEG200.

The playback manager 140 monitors for occurrence of a next scheduled advertisement break, which is scheduled to occur at or around time T200 as specified by the manifest file 148 or other suitable entity. In response to detecting the count value of the playback counter 143 being at or around T200, the playback manager 140 discontinues playback of the supplemental media 120-S because, as indicated by the list 149) it is known by the playback manager 140 that the playback manager 145 will implement an advertisement playback instead of playing back the content 120. Between time playback time PT225 and PT250, the playback manager 145 plays back advertisement ADV2 on primary playback resource 151.

Additionally, during all or a portion of the timeframe between PT225 and PT250, the playback manager 140 attempts to re-synchronize with the primary playback resource 151 via monitoring output 106 because the playback manager 145 eventually resumes playback of the content 120 again after playback of the advertisement. For example, after playback of the advertisement ADV2 between PT225 and PT250, the primary playback resource 151 starts playing back the content 120 at segment SEG201 at or around time PT250. In response to detecting playback of the segment SEG201 at or around playback time PT250, during re-synchronization at or around playback time PT250, the playback manager 140 sets the playback counter 143 to a time stamp value of T201. Thus, during re-synchronization at or around time PT250, the playback manager 140 detects playback of the segment SEG201 and sets the playback counter 143 to time stamp T201. The playback counter 143 then increments the playback counter 143 over time in a manner as previously discussed. The playback counter 143 is again used by the playback manager 140 to control playback of corresponding supplemental media 120-S via the secondary playback resource 152.

The playback manager 140 monitors for occurrence of a next scheduled advertisement break, which is scheduled to occur at or around time T300 (corresponding to playback time PT350). In response to detecting the count value of the playback counter 143 incrementing to a value at or around T300, the playback manager 140 discontinues playback of the supplemental media 120-S because it is known that the playback manager 145 will implement an advertisement playback instead of the content 120. Between time playback time PT350 and PT375, the playback manager 145 plays back advertisement ADV3 on primary playback resource 151.

Additionally, during the timeframe between PT350 and PT375, the playback manager 140 attempts to re-synchronize with the primary playback resource 151 via monitoring output 106 because the playback manager 145 eventually resumes playback of the content 120 again after playback of the advertisement. For example, after playback of the advertisement ADV3, the primary playback resource 151 starts playing back the content 120 at segment SEG301 at or around time PT375. In response to detecting playback of the segment SEG301 at or around playback time PT375, the playback manager 140 sets and starts incrementing the playback counter 143 from a time stamp value of T301. Thus, during re-synchronization at or around time PT375, the playback manager 140 detects playback of the segment SEG301 and sets the playback counter 143 to time stamp T301. The playback counter 143 then increments the playback counter 143 over time. The playback counter 143 is again used by the playback manager 140 to control playback of corresponding supplemental media 120-S via the secondary playback resource 152.

Figure 6:
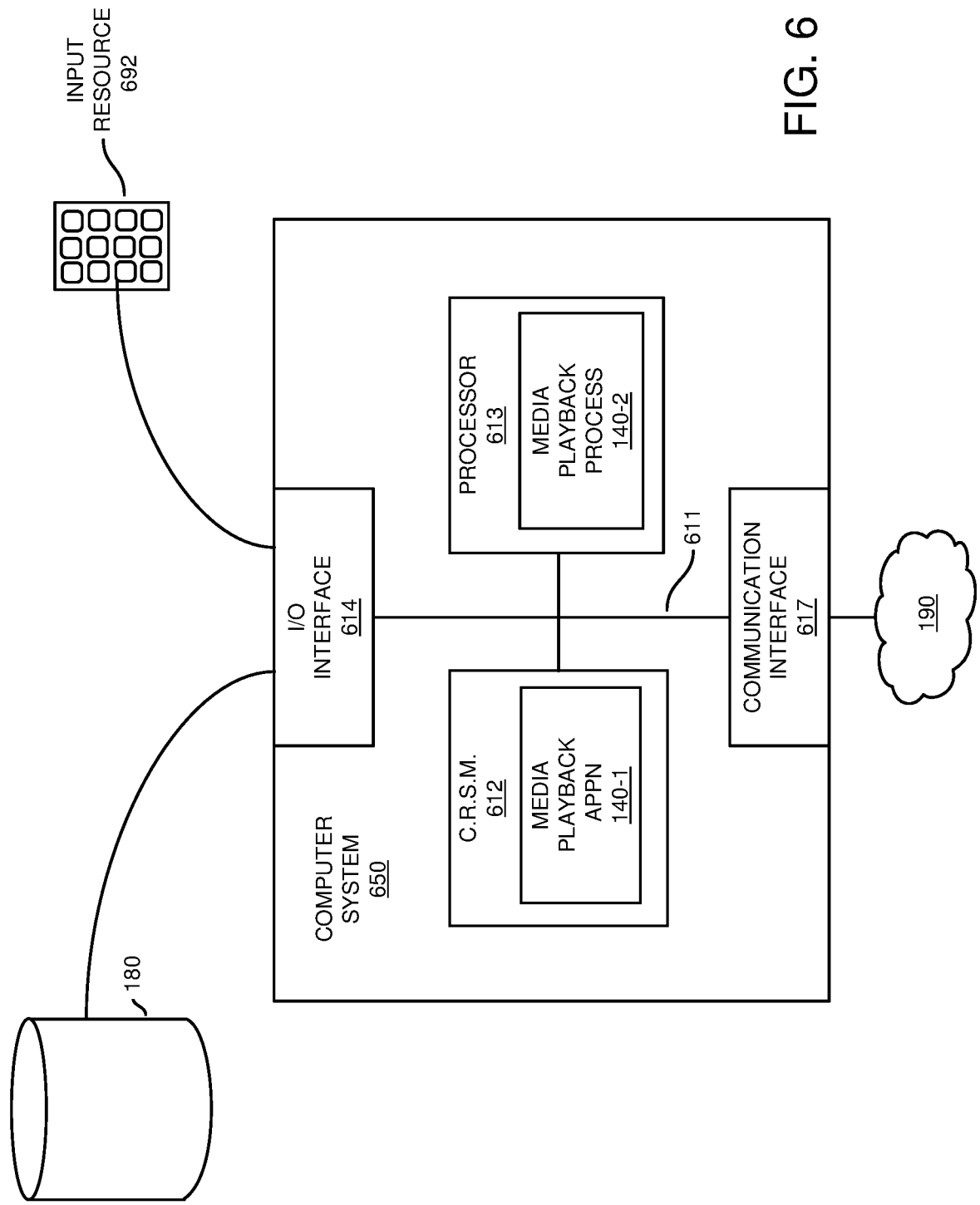
FIG. 6 is an example diagram illustrating example computer architecture operable to execute one or more operations according to embodiments herein.

FIG. 6 is an example block diagram of a computer system for implementing any of the operations as previously discussed according to embodiments herein.

Any of the resources (such as primary playback resource 151, secondary playback resource 152, playback manager 145, playback manager 140, etc.) as discussed herein can be configured to include computer processor hardware and/or corresponding executable instructions to carry out the different operations as discussed herein.

As shown, computer system 650 of the present example includes an interconnect 611 that coupling computer readable storage media 612 such as a non-transitory type of media (which can be any suitable type of hardware storage medium in which digital information can be stored and retrieved), a processor 613 (computer processor hardware), I/O interface 614, and a communications interface 617.

I/O interface(s) 614 supports connectivity to repository 180 and input resource 692.

Computer readable storage medium 612 can be any hardware storage device such as memory, optical storage, hard drive, floppy disk, etc. In one embodiment, the computer readable storage medium 612 stores instructions and/or data.

As shown, computer readable storage media 612 can be encoded with media playback application 140-1 (e.g., including instructions) to carry out any of the operations as discussed herein.

During operation of one embodiment, processor 613 accesses computer readable storage media 612 via the use of interconnect 611 in order to launch, run, execute, interpret or otherwise perform the instructions in media playback application 140-1 (such as executed by the playback manager 140, playback manager 145, etc.) stored on computer readable storage medium 612. Execution of the media playback application 140-1 produces media playback process 140-2 to carry out any of the operations and/or processes as discussed herein.

Those skilled in the art will understand that the computer system 650 can include other processes and/or software and hardware components, such as an operating system that controls allocation and use of hardware resources to execute media playback application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 7. Note that the steps in the flowcharts below can be executed in any suitable order.

FIG. 7 is a flowchart 700 illustrating an example method according to embodiments. Note that there will be some overlap with respect to concepts as discussed above.

In processing operation 710, the playback manager 145 of the secondary playback resource 152 detects progress (such as current playback location) of playing back content 120 on a primary playback resource 151.

In processing operation 720, based on the detected progress, the playback manager 140 initially synchronizes playback of supplemental media 120-S associated with the content 120 on a secondary playback resource 152.

In processing operation 730, in response to detecting an advertisement window (e.g., scheduled advertisement break) during playback of the content 120 on the primary playback resource 151, the playback manager 140 of the secondary playback resource 152 discontinues playback of the supplemental media 120-S associated with the content 120 on the secondary playback resource 152.

In processing operation 740, subsequent to a time of the discontinued playback of the supplemental media 120-S associated with the content 120 on the secondary playback resource 152, the secondary playback resource 152 monitors and detects a second progress of playing back the content 120 on the primary playback resource 151.

In processing operation 750, based on the second detected progress, the playback manager 140 of the secondary playback resource 152 resynchronizes playback of supplemental media 120-S associated with the content 120 on the secondary playback resource 152.

Note again that techniques herein are well suited to facilitate synchronization and re-synchronization of playing back supplemental media associated with playback of primary content. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   detecting progress of playing back content on a primary playback system;
   based on the detected progress, synchronizing playback of supplemental media associated with the content on a secondary playback system;
   in response to detecting an advertisement window during playback of the content on the primary playback system, discontinuing playback of the supplemental media associated with the content on the secondary playback system;
   wherein the content includes multiple segments played back by the primary playback system the method further comprising: implementing a counter to track which of the segments is being played back by the primary playback system; and
   wherein implementing the counter includes: incrementing a count value in the counter prior to the advertisement window; and maintaining the count value in the counter, at a constant value during the advertisement window.

2. The method as in claim 1, wherein the primary playback system plays back an advertisement during the advertisement window.

3. The method as in claim 1, wherein the playback of the supplemental media associated with the content is an audio signal describing images of the content displayed on a display screen of the primary playback system.

4. The method as in claim 1, wherein the playback of the supplemental media associated with the content is a text signal pertinent to the content displayed on a display screen of the primary playback system.

5. The method as in claim 1 further comprising:
receiving schedule information;
utilizing the schedule information to identify a time at which the advertisement window is scheduled to occur during playback of the content on the primary playback system; and
discontinuing playback of the supplemental media associated with the content on the secondary playback system at the identified time.

6. The method as in claim 1, wherein the detected progress is first progress, the method further comprising:
subsequent to a time of the discontinued playback of the supplemental media associated with the content on the secondary playback system, detecting second progress of playing back the content on the primary playback system; and
based on the second detected progress, synchronizing playback of supplemental media associated with the content on the secondary playback system.

7. The method as in claim 1, wherein synchronizing playback of supplemental media associated with the content on the secondary playback system includes:
receiving an audio signal produced during playback of the content on the primary playback system;
determining a playback location of the audio signal in the content;
mapping the playback location of the audio signal to a playback location in the supplemental media; and
initiating playback of the supplemental media on the secondary playback system starting at the playback location in the supplemental media.

8. The method as in claim 1 further comprising:
detecting the advertisement window via a time value retrieved from a manifest file associated with the content being played back on the primary playback system.

9. The method as in claim 1 further comprising:
at the secondary playback system: i) receiving notification of a selection of the content to play back on the primary playback system; and ii) downloading the supplemental media as specified by the notification to the secondary playback system.

10. The method as in claim 1, wherein detecting progress of playing back content on the primary playback system includes: i) receiving a signal indicative of the progress of playing back the content on the primary playback system, ii) deriving an index value from the signal, the index value indicative of a playback location of the content.

11. The method as in claim 10, wherein synchronizing playback of supplemental media associated with the content on a secondary playback system based on the detected progress includes:
initiating playback of the supplemental media in accordance with the index value.

12. The method as in claim 1, wherein the secondary playback system is disparately located with respect to the primary playback system.

13. The method as in claim 1, wherein detecting progress of playing back content on the primary playback system includes:
at the secondary playback system, monitoring an audio signal associated with playback of the content on the primary playback system.

14. The method as in claim 1, wherein playback of the content includes playback of images on the primary playback system; and
wherein playback of the supplemental media on the secondary playback system includes playback of an audible description of the images, the playback of the audible description synchronized with the playback of the images.

15. The method as in claim 1, wherein playback of the content includes output of an audible signal and display of images by the primary playback system, the audible signal synchronized with display of the images;
wherein the detected progress is first progress, the method further comprising:
subsequent to a time of the discontinued playback of the supplemental media associated with the content on the secondary playback system, monitoring second progress of playing back the content by the primary playback system based on the audible signal outputted from the primary playback system; and
based on the second detected progress, synchronizing playback of the supplemental media associated with the content on the secondary playback system.

16. The method as in claim 15, wherein playback of the supplemental media on the secondary playback system includes playback of an audible description of the images, the playback of the audible description synchronized with the playback of the images.

17. The method as in claim 1 further comprising:
detecting a start time of the advertisement window via a time value retrieved from a manifest file associated with the content being played back on the primary playback system, the primary playback system operative to use the manifest file to retrieve and playback different segments of the content; and
subsequent to the start time of the discontinued playback of the supplemental media on the secondary playback system:
receiving an audio signal associated with playback of the content on the primary playback system;
determining a playback location of the audio signal in the content;
mapping the playback location of the audio signal to a playback location in the supplemental media; and
initiating playback of the supplemental media on the secondary playback system starting at the playback location of the supplemental media.

18. The method as in claim 17, wherein playback of the supplemental media on the secondary playback system includes playback of an audible description of images of the content played back by the primary playback system, the playback of the audible description by the secondary playback system synchronized with the playback of the images by the primary playback system.

19. The method as in claim 1, further comprising:
detecting a start time of the advertisement window via a time value retrieved from a manifest file associated with the content being played back on the primary playback system, the primary playback system operative to use the manifest file to retrieve and playback different segments of the content; and
determining occurrence of the start time of the advertisement window via matching of the time value to the count value in the counter.

20. The method as in claim 19, wherein playback of the supplemental media on the secondary playback system includes playback of an audible description of images played back on the primary playback system, the playback of the audible description by the secondary playback system synchronized with the playback of the images by the primary playback system.

21. The method as in claim 19 further comprising:
adjusting the count value in the counter prior to the advertisement window in response to the synchronizing playback of supplemental media associated with the content on the secondary playback system.

22. The method as in claim 1, wherein implementing the counter further includes:
incrementing the count value in the counter after the advertisement window.

23. A system comprising:
communication management hardware operative to:
detect progress of playing back content on a primary playback system;
based on the detected progress, synchronize playback of supplemental media associated with the content on a secondary playback system;
in response to detecting an advertisement window during playback of the content on the primary playback system, discontinue playback of the supplemental media associated with the content on the secondary playback system;
wherein the content includes multiple segments played back by the primary playback system, the communication management hardware further operative to: implement a counter to track which of the segments is being played back by the primary playback system; and
wherein implementation of the counter includes: incrementing a count value in the counter prior to the advertisement window; and maintaining the count value in the counter at a constant value during the advertisement window.

24. The method as in claim 23, wherein the primary playback system plays back an advertisement during the advertisement window.

25. The system as in claim 23, wherein the playback of the supplemental media associated with the content is an audio signal describing images of the content displayed on a display screen of the primary playback system.

26. The system as in claim 23, wherein the playback of the supplemental media associated with the content includes display of text pertinent to the content displayed on a display screen of the primary playback system.

27. The system as in claim 23, wherein the communication management hardware is further operative to:
receive schedule information;
utilize the schedule information to identify a time at which the advertisement window is going to occur during playback of the content on the primary playback system; and
discontinue playback of the supplemental media associated with the content on the secondary playback system at the identified time.

28. The system as in claim 23, wherein the detected progress is first progress; and
wherein the communication management hardware is further operative to:
subsequent to a time of the discontinued playback of the supplemental media associated with the content on the secondary playback system, detect second progress of playing back the content on the primary playback system; and
based on the second detected progress, synchronize playback of supplemental media associated with the content on the secondary playback system.

29. The system as in claim 23, wherein the communication management hardware is further operative to:
receive an audio signal produced during playback of the content on the primary playback system;
determine a playback location of the audio signal in the content;
map the playback location of the audio signal to a playback location in the supplemental media; and
initiate playback of the supplemental media on the secondary playback system starting at the playback location in the supplemental media.

30. The system as in claim 23, wherein the communication management hardware is further operative to:
detect the advertisement window via a time value retrieved from a manifest file associated with the content being played back on the primary playback system.

31. The system as in claim 23, wherein the communication management hardware is further operative to:
i) receive notification of a selection of the content to play back on the primary playback system; and ii) download the supplemental media as specified by the notification to the secondary playback system.

32. The system as in claim 23, wherein the communication management hardware is further operative to: i) receive a signal indicative of the progress of playing back the content on the primary playback system, ii) derive an index value from the signal, the index value indicative of a playback location of the content.

33. The system as in claim 32, wherein the communication management hardware is further operative to:
initiate playback of the supplemental media in accordance with the index value.

34. The system as in claim 23, wherein the secondary playback system is disparately located with respect to the primary playback system.

35. The system as in claim 23, wherein the communication management hardware is further operative to:
at the secondary playback system, monitor an audio signal associated with playback of images of the content on the primary playback system.

36. Computer-readable storage hardware having instructions stored thereon, the instructions, when carried out by computer processor hardware, cause the computer processor hardware to:
detect progress of playing back content on a primary playback system;
based on the detected progress, synchronize playback of supplemental media associated with the content on a secondary playback system;
in response to detecting an advertisement break in playing back the content on the primary playback system, discontinue playback of the supplemental media associated with the content on the secondary playback system;
wherein the content includes multiple segments played back by the primary playback system, the computer processor hardware further operative to: implement a counter to track which of the segments is being played back by the primary playback system; and
wherein the computer processor hardware further operative to: increment a count value in the counter prior to the window of time; and maintain the count value in the counter at a constant value during the window of time.

* * * * *

UNITED STATES PATENT AND TRADEMARK OFFICE
CERTIFICATE OF CORRECTION

| | |
|---|---|
| PATENT NO. | : 11,678,003 B2 |
| APPLICATION NO. | : 17/352565 |
| DATED | : June 13, 2023 |
| INVENTOR(S) | : John Sweet, Horatio Derrick Kipchoge Boothe and Cristian G. Vyhmeister |

It is certified that error appears in the above-identified patent and that said Letters Patent is hereby corrected as shown below:

In the Claims

Claim 1, Line 13, replace "system the" with --system, the--
Claim 1, Line 20, replace "ter, at" with --ter at--
Claim 36, Line 17, replace "hardware" with --hardware is--

Signed and Sealed this
Twenty-second Day of August, 2023

Katherine Kelly Vidal
*Director of the United States Patent and Trademark Office*